United States Patent
Lou et al.

(10) Patent No.: US 11,650,633 B2
(45) Date of Patent: May 16, 2023

(54) DISPLAY PANEL AND DISPLAY APPARATUS

(71) Applicant: KunShan Go-Visionox Opto-Electronics Co., Ltd., Kunshan (CN)

(72) Inventors: Junhui Lou, Kunshan (CN); Shixing Cai, Kunshan (CN); Yong Wu, Kunshan (CN); Lin Ge, Kunshan (CN); Yanan Ji, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 17/590,320

(22) Filed: Feb. 1, 2022

(65) Prior Publication Data

US 2022/0155829 A1     May 19, 2022

Related U.S. Application Data

(63) Continuation of application No. PCT/CN2021/070416, filed on Jan. 6, 2021.

(30) Foreign Application Priority Data

Feb. 27, 2020   (CN) .......................... 202010124648.5

(51) Int. Cl.
*G09G 3/20* (2006.01)
*G06F 1/16* (2006.01)
(Continued)

(52) U.S. Cl.
CPC .......... *G06F 1/1686* (2013.01); *G06V 10/147* (2022.01); *G06V 40/16* (2022.01);
(Continued)

(58) Field of Classification Search
CPC ............. G06K 9/0004; G06K 9/00046; G06K 9/00006; G06V 40/1318; G06V 40/12;
(Continued)

(56) References Cited

U.S. PATENT DOCUMENTS

| | | | | |
|---|---|---|---|---|
| 2015/0078586 | A1* | 3/2015 | Ang | .......................... H03G 3/04 381/109 |
| 2018/0067245 | A1* | 3/2018 | Giachino | .............. H01S 5/4025 |

(Continued)

FOREIGN PATENT DOCUMENTS

| | | |
|---|---|---|
| CN | 102681808 A | 9/2012 |
| CN | 108764044 A | 11/2018 |

(Continued)

OTHER PUBLICATIONS

International Search Report dated Apr. 12, 2021, in corresponding to International Application No. PCT/CN2021/070416; 8 pages (with English Translation).

(Continued)

*Primary Examiner* — Yuzhen Shen
(74) *Attorney, Agent, or Firm* — Maier & Maier, PLLC

(57) ABSTRACT

A display panel and a display apparatus. The display panel includes a first transparent display region, at least one second transparent display region and a main display region. Light transmittance of the first transparent display region is greater than light transmittance of the at least one second transparent display region, and the light transmittance of the at least one second transparent display region is greater than light transmittance of the main display region. Light passes through the first transparent display region and enters a first photosensitive element located on a back of the display panel, light passes through the at least one second transparent display region and enters a second photosensitive element located on the back of the display panel, and the first (Continued)

photosensitive element requires a greater brightness of light than the second photosensitive element.

20 Claims, 5 Drawing Sheets

(51) Int. Cl.
*H04N 13/204* (2018.01)
*G06V 40/16* (2022.01)
*G06V 10/147* (2022.01)

(52) U.S. Cl.
CPC ............. *G09G 3/20* (2013.01); *H04N 13/204* (2018.05); *G09G 2300/0426* (2013.01); *G09G 2300/0439* (2013.01)

(58) Field of Classification Search
CPC .. G06F 3/042; G02F 1/13318; G02F 1/13312; G02F 1/133514; G02F 1/136222; G02F 1/133512; G02F 1/136209
See application file for complete search history.

(56) References Cited

U.S. PATENT DOCUMENTS

| | | | | |
|---|---|---|---|---|
| 2020/0295300 | A1* | 9/2020 | Chung | H01L 51/5225 |
| 2021/0066409 | A1* | 3/2021 | Fan | H01L 27/3234 |
| 2021/0408182 | A1* | 12/2021 | Chung | H01L 27/3244 |

FOREIGN PATENT DOCUMENTS

| | | | | |
|---|---|---|---|---|
| CN | 108983872 | A | 12/2018 | |
| CN | 109192759 | A | 1/2019 | |
| CN | 109215525 | A | 1/2019 | |
| CN | 109600459 | A | 4/2019 | |
| CN | 109801903 | A | 5/2019 | |
| CN | 109817143 | A | 5/2019 | |
| CN | 109840475 | A | 6/2019 | |
| CN | 109994047 | A | 7/2019 | |
| CN | 209328043 | U | 8/2019 | |
| CN | 110264894 | A | 9/2019 | |
| CN | 110289286 | A | 9/2019 | |
| CN | 110379836 | A | 10/2019 | |
| CN | 110648622 | A | 1/2020 | |
| CN | 110767688 | A | 2/2020 | |
| CN | 110767710 | A | 2/2020 | |
| CN | 110808267 | A | 2/2020 | |
| CN | 210052743 | U | 2/2020 | |
| CN | 111292617 | A | 6/2020 | |
| CN | 111369946 | A * | 7/2020 | ............. G09G 3/035 |
| CN | 112002749 | A | 11/2020 | |
| WO | 2019109903 | A1 | 6/2019 | |

OTHER PUBLICATIONS

The First Office Action dated Apr. 2, 2021, issued in corresponding to Chines Application No. 202010124648.5; 13 pages (with machine translation).

* cited by examiner

DISPLAY PANEL AND DISPLAY APPARATUS

CROSS REFERENCE TO RELATED APPLICATIONS

The present application is a continuation of International Patent Application No. PCT/CN2021/070416, filed on Jan. 6, 2021, which is based on and claims priority to Chinese patent application 202010124648.5 filed with the CNIPA on Feb. 27, 2020, disclosures of which are incorporated herein by reference in their entireties.

TECHNICAL FIELD

The present disclosure relates to the technical field of display panels, and particularly, to a display panel and a display apparatus.

BACKGROUND

With the rapid development of electronic devices, users have increasingly higher requirements for the screen-to-body ratio, so that full screens of electronic devices attract more and more attention in the industry. Traditional electronic devices such as mobile phones and tablet computers need to integrate front-facing cameras, receivers and infrared sensing elements, so that their display screens can be notched, and cameras, receivers and infrared sensing elements are disposed in the notched regions. However, the display screens of these electronic devices are not full screens in the true sense and cannot perform display in various regions of the entire screen. For example, images cannot be displayed in the camera region. In order to achieve true full screens, the under-screen camera technology has emerged.

However, for display panels adopting the under-screen camera technology, the transparent display region can only satisfy the use of the front-facing camera, and thus a problem exists of insufficient space of the transparent display region for a human face recognition device or a three-dimensional (3D) imaging device. Therefore, how to improve the insufficient space of the transparent display region of the display panel has become an urgent problem to be solved in the industry.

SUMMARY

The present disclosure provides a display panel and a display apparatus, so that the space utilization of the transparent display region of the display panel can be improved.

The present disclosure provides a display panel.

The display panel includes a first transparent display region, at least one second transparent display region and a main display region.

Light transmittance of the first transparent display region is greater than light transmittance of the at least one second transparent display region, and the light transmittance of the at least one second transparent display region is greater than light transmittance of the main display region.

A back of the display panel is provided with a first photosensitive element and a second photosensitive element, the first photosensitive element requires a greater brightness of light than the second photosensitive element, a position of the first photosensitive element corresponds to a position of the first transparent display region to enable light to pass through the first transparent display region and enter the first photosensitive element located on the back of the display panel, and a position of the at least one second transparent display region corresponds to a position of the second photosensitive element to enable light to pass through the at least one second transparent display region and enter the second photosensitive element located on the back of the display panel.

The present disclosure further provides a display apparatus. The display apparatus includes the display panel of any one of the above items.

The display panel provided by the present disclosure includes a first transparent display region, at least one second transparent display region and a main display region surrounding at least part of the first transparent display region and at least part of the second transparent display region. The first transparent display region is correspondingly provided with a first photosensitive element, and the first photosensitive element collects light through the first transparent display region. Light transmittance of the first transparent display region is greater than light transmittance of the second transparent display region, and the light transmittance of the second transparent display region is greater than light transmittance of the main display region. The first photosensitive element corresponds to a position of the first transparent display region to enable light passing through the first transparent display region to enter the first photosensitive element located on a back of the display panel. The at least one second transparent display panel corresponds to a position of a second photosensitive element to enable light passing through the second transparent display region to enter the second photosensitive element located on the back of the display panel, where the first photosensitive element requires a greater brightness of light than the second photosensitive element. In this way, the first transparent display region can satisfy the use of the first photosensitive element, and the second transparent display region can satisfy the use of the second photosensitive element, so that the space utilization of the transparent display region of the display panel can be improved, and the problem of insufficient space of the transparent display region of the display panel can be improved.

DETAILED DESCRIPTION

The present disclosure is described below in conjunction with drawings and embodiments. Specific embodiments described herein are merely intended to explain the present disclosure.

For a display panel adopting the under-screen camera technology, a problem exists of insufficient space of a transparent display region for components configured for human face recognition or three-dimensional (3D) imaging. In order to place pixel driving circuits of the transparent display region, it is necessary to reduce pixel resolution of a transition display region so that the pixel resolution of the transition display region is lower than pixel resolution of a main display region. To reduce the number of pixel electrode leads, it is also necessary to reduce pixel resolution of the transparent display region. However, due to the space limitation of wiring of electrode leads, the size of the transparent display region cannot be designed to be very large. As a result, the transparent display region can only satisfy the use of a front-facing camera, which affects the device for human face recognition or 3D imaging disposed in the transparent display region of the display panel.

Figure 1:
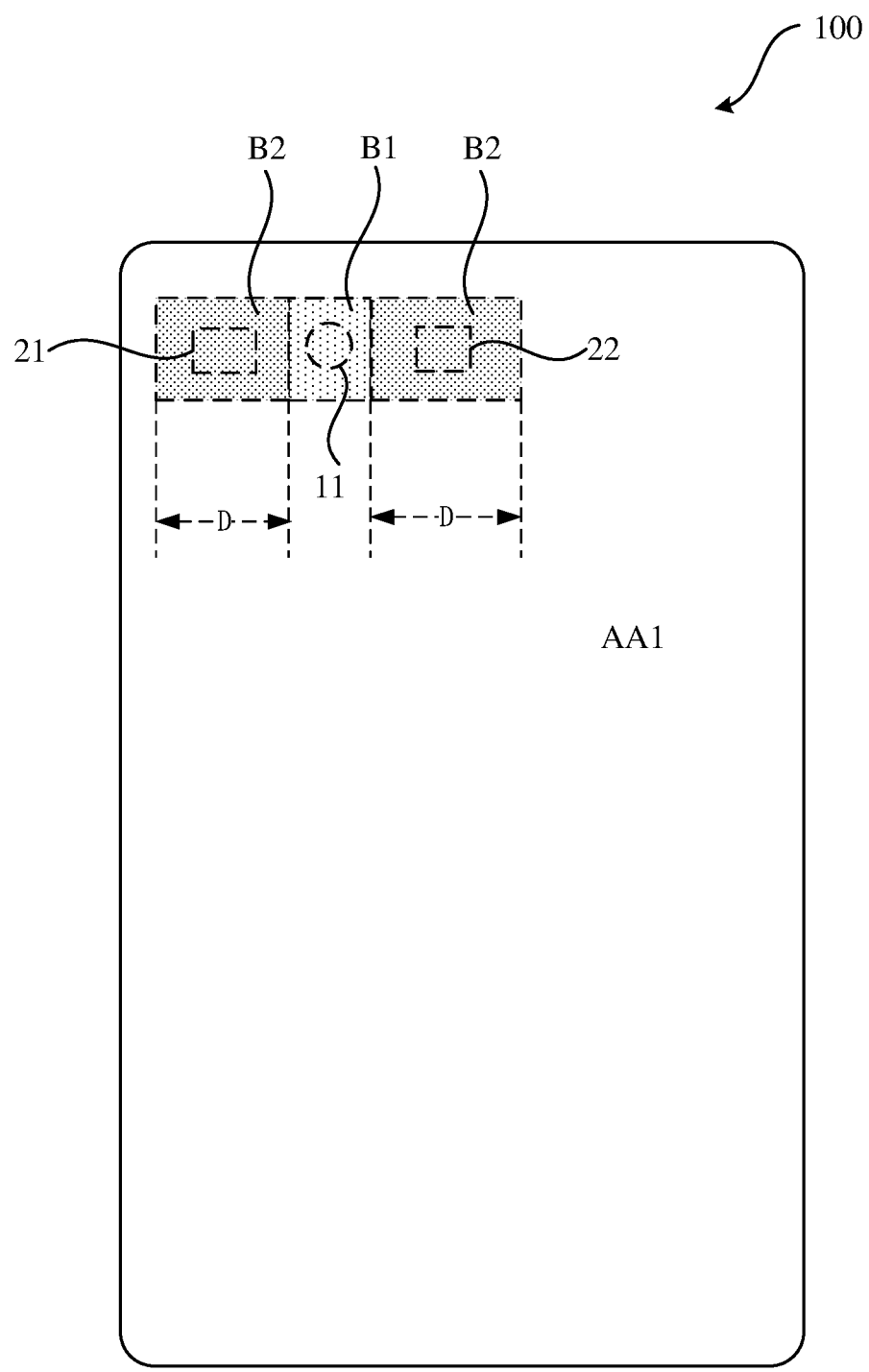
FIG. 1 is a top structural view of a display panel according to an embodiment.

FIG. 1 is a top structural view of a display panel according to an embodiment. Referring to FIG. 1, the display panel 100 provided by the embodiment of the present disclosure includes a first transparent display region B1, at least one second transparent display region B2 and a main display region AA1 surrounding at least part of the first transparent display region B1 and at least part of the second transparent display region B2. A back of the display panel 100 is provided with a first photosensitive element and a second photosensitive element, the first photosensitive element requires a greater brightness of light than the second photosensitive element. For example, the first photosensitive element includes a camera component 11, and the second photosensitive element includes at least one of a human face recognition device 21 or a three-dimensional imaging device 22, respectively. The camera component 11 corresponds to a position of the first transparent display region B1 to enable light passing through the first transparent display region B1 to enter the camera component 11 located on the back of the display panel 100. The at least one second transparent display region B2 corresponds to a position of the human face recognition device 21 and/or 3D imaging device 22 to enable light passing through the at least one second transparent display region B2 to enter the human face recognition device 21 and/or 3D imaging device 22 located on the back of the display panel 100.

Light transmittance of the first transparent display region B1 is set to be greater than light transmittance of the at least one second transparent display region B2, and the light transmittance of the at least one second transparent display region B2 is greater than light transmittance of the main display region AA1. The camera component 11 is disposed in the first transparent display region B1 to satisfy the requirement of the camera component 11 for high light transmittance, which is beneficial to achieve the full-screen display. According to requirements, the display panel may be set to include at least one second transparent display region B2. For example, two second transparent display regions B2 are set. One second transparent display region B2 is correspondingly provided with a human face recognition device 21, and the human face recognition device 21 is configured to collect light through the corresponding second transparent display region B2. The human face recognition device 21 may be a human face image collection device, such as a camera. Human face images, such as the human face images which are static, dynamic, captured by the camera at different positions, or of different expressions are collected by the camera. When a user is within the shooting range of the collection device, the human face image collection device will automatically search for and shoot the face image of the user.

Another second transparent display region B2 is correspondingly provided with a 3D imaging device 22, and the 3D imaging device is configured to collect light through the corresponding second transparent display region B2. The 3D imaging device 22 may include a structured light 3D imaging device or a time-of-flight (TOF) 3D imaging device. The principle of the structured light 3D imaging device is that the structured light 3D imaging device emits diffraction light spots on an object, and a sensor receives the deformed light spots, so as to determine depth information according to the amount of the deformation of the light spots. TOF is that laser pulses are continuously emitted to a target, then a sensor is used to receive the reflected light, and the exact distance of the target is obtained by detecting the round-trip flight time of the laser pulses. Exemplarily, the two second transparent display regions B2 may be respectively disposed at two sides of the first transparent display region B1.

The display panel 100 may also be provided with only one second transparent display region B2. The second transparent display region B2 is correspondingly provided with a human face recognition device 21 and/or a 3D imaging device 22. Since the human face recognition device 21 and the 3D imaging device 22 have relatively low requirements on the brightness of light than the camera component 11, the light transmittance of the second transparent display region B2 may be lower than the light transmittance of the first transparent display region B1. Pixel driving circuits of the second transparent display region B2 are disposed in the second transparent display region B2, and the size of the second transparent display region B2 may be designed to be relatively large to accommodate the human face recognition device 21 and the 3D imaging device 22.

In order to place pixel driving circuits of a transparent display region, it is necessary to reduce pixel resolution of a transition display region so that the pixel resolution of the transition display region is lower than pixel resolution of the main display region. The pixel driving circuits corresponding to the transparent display region are disposed in the transition display region. Pixel structures of the transparent display region are electrically connected to the pixel driving circuits corresponding to the transparent display region and disposed in the transition display region through electrode leads. However, due to the space limitation of the electrode leads, the size of the transparent display region cannot be designed to be very large. As a result, the transparent display region can only satisfy the use of a front-facing camera, which affects a device for human face recognition or a device for 3D imaging disposed in the transparent display region of the display panel.

In the embodiment, the display panel includes a first transparent display region and at least one second transparent display region, and the first transparent display region is correspondingly provided with a camera component which is configured to collect light through the first transparent display region. Light transmittance of the first transparent display region is greater than light transmittance of the second transparent display region, and the light transmittance of the second transparent display region is greater than light transmittance of a main display region. In order to improve the light transmittance of the first transparent display region and the light transmittance of the second transparent display region, the number of pixel driving circuits of the first transparent display region and the number of pixel driving circuits of the second transparent display region may be reduced. Since pixels and pixel driving circuits are in one-to-one correspondence, pixel resolution of the first transparent display region and pixel resolution of the second transparent display region may be set to be lower than pixel resolution of the main display region, so that the number of pixel driving circuits of the first transparent display region and the number of pixel driving circuits of the second transparent display region are reduced. The camera component corresponds to a position of the first transparent display region so that light passes through the first transparent display region to enter the camera component located on a back of the display panel. The at least one second transparent display region corresponds to a position of a human face recognition device and/or 3D imaging device so that light passes through the second transparent display region to enter the human face recognition device and/or 3D imaging device located on the back of the display panel. In this way, the first transparent display region can satisfy the use of the camera component, and the second transparent display region can satisfy the use of the human face recognition device and/or 3D imaging device, so that the full-screen display panel adopting the under-screen camera technology can achieve the human face recognition function and/or the 3D imaging function, the space utilization of the transparent display region of the display panel can be improved, and the problem of insufficient space of the transparent display region of the display panel can be improved.

Figure 2:
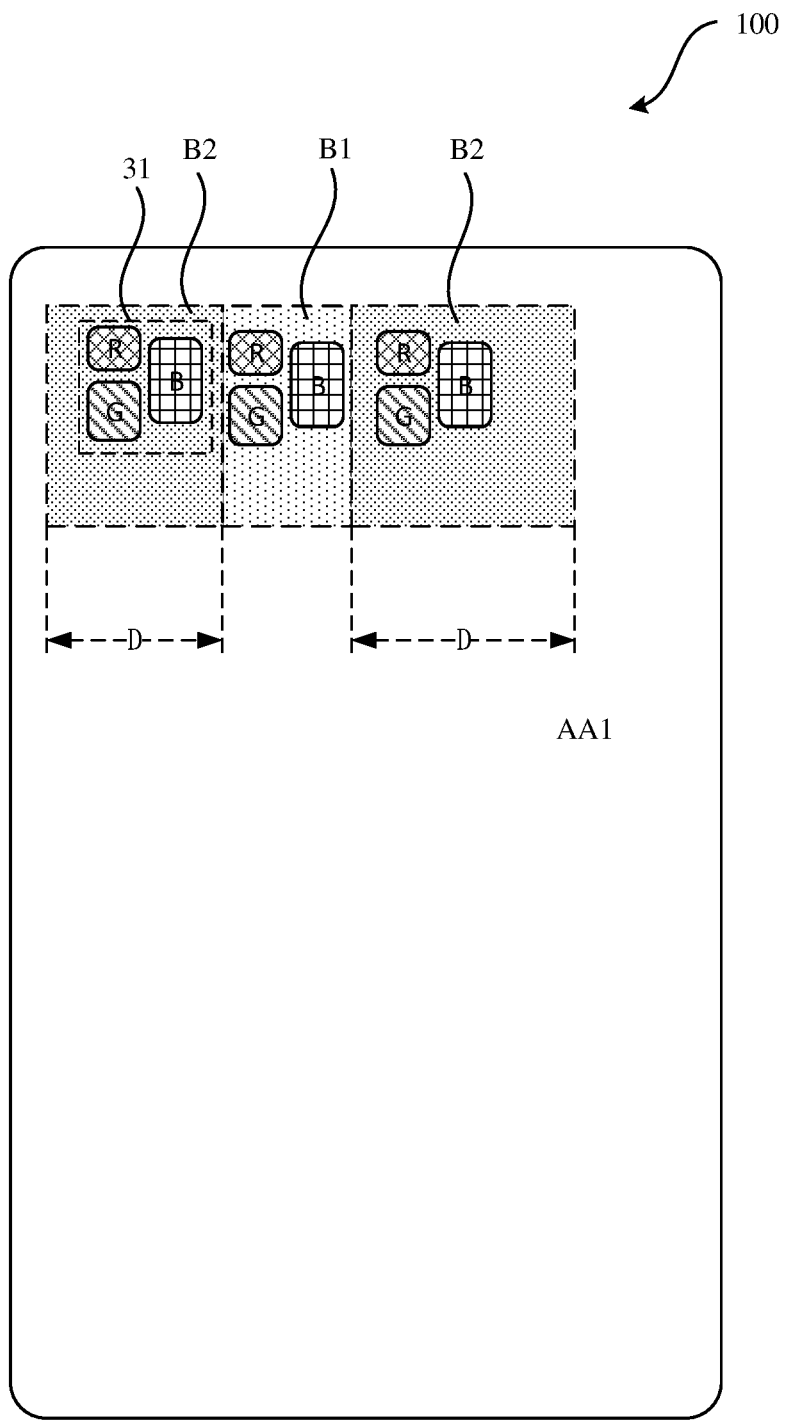
FIG. 2 is a top structural view of another display panel according to an embodiment.

FIG. 2 is a top structural view of another display panel according to an embodiment. Referring to FIG. 1 and FIG. 2, it may be set that a pixel arrangement rule of the first transparent display region B1 is the same as a pixel arrangement rule of the at least one second transparent display region B2. For example, each pixel 31 includes a red sub-pixel R, a green sub-pixel G and a blue sub-pixel B. The pixel arrangement rule of the first transparent display region B1 is the same as the pixel arrangement rule of the at least one second transparent display region B2, thus it may be set that a relative position relationship between pixels 31 in the first transparent display region B1 is the same as a relative position relationship between pixels 31 in the at least one second transparent display region B2, and a relative position relationship between a red sub-pixel R, a green sub-pixel G and a blue sub-pixel B in each pixel 31 in the first transparent display region B1 is the same as a relative position relationship between a red sub-pixel R, a green sub-pixel G and a blue sub-pixel B in each pixel 31 in the at least one second transparent display region B2. In addition, the number of transistors included in the pixel driving circuit of the first transparent display region B1 are the same as the number of transistors included in the pixel driving circuit of the at least one second transparent display region B2, and the number of capacitors included in the pixel driving circuit of the first transparent display region B1 are the same as the number of capacitors included in the pixel driving circuit of the at least one second transparent display region B2.

Under the premise that the light transmittance of the first transparent display region B1 is greater than the light transmittance of the at least one second transparent display region B2, it may be set that the number of transistors and the number of capacitors included in the pixel driving circuit and the pixel arrangement rule of the first transparent display region B1 are the same as the number of transistors and the number of capacitors included in the pixel driving circuit and the pixel arrangement rule of the at least one second transparent display region B2, respectively. The pixel arrangement rule of the first transparent display region B1 is the same as the pixel arrangement rule of the at least one second transparent display region B2, so that the display uniformity of the first transparent display region B1 and the at least one second transparent display region B2 is good, that is, the display effect of the first transparent display region B1 is kept consistent with the display effect of the at least one second transparent display region B2. Therefore, the display boundary between the first transparent display region B1 and the at least one second transparent display region B2 is not obvious, and thus the display effect of the display panel is improved. In addition, the number of transistors and the number of capacitors included in the pixel driving circuit of the first transparent display region B1 are the same as the number of transistors and the number of capacitors included in the pixel driving circuit of the at least one second transparent display region B2 respectively, so that the drive of the first transparent display region B1 is consistent with the drive of the at least one second transparent display region B2. Therefore, the first transparent display region B1 and the at least one second transparent display region B2 can adopt a same gamma drive, so that it is not necessary to occupy an additional gamma drive module in the driver chip of the display panel.

Optionally, the pixel resolution of the first transparent display region B1 is lower than the pixel resolution of the at least one second transparent display region B2, and the pixel resolution of the at least one second transparent display region B2 is lower than the pixel resolution of the main display region AA1. In the case where the number of transistors and the number of capacitors included in the pixel driving circuit and the pixel arrangement rule of the first transparent display region B1 are the same as the number of transistors and the number of capacitors included in the pixel driving circuit and the pixel arrangement rule of the at least one second transparent display region B2 respectively, the number of pixels of the first transparent display region B1 and the number of pixels of the at least one second transparent display region B2 may be changed to achieve the difference between the pixel resolution of the first transparent display region B1 and the pixel resolution of the at least one second transparent display region B2. For example, the number of pixels of the first transparent display region B1 may be set to be less than the number of pixels of the at least one second transparent display region B2, so that the pixel resolution of the first transparent display region B1 is lower than the pixel resolution of the at least one second transparent display region B2, and the light transmittance of the first transparent display region B1 is improved. Therefore, the light transmittance of the first transparent display region B1 is ensured to be greater than the light transmittance of the at least one second transparent display region B2, and thus the first transparent display region B1 satisfies the requirement of a front-facing camera to collect light from the first transparent display region B1.

In addition, it may be set that the number of pixels of the at least one second transparent display region B2 is less than the number of pixels of the main display region AA1, so that the pixel resolution of the at least one second transparent display region B2 is lower than the pixel resolution of the main display region AA1. In this way, pixel driving circuits corresponding to pixel structures of the at least one second transparent display region B2 has small density, the light transmittance of the at least one second transparent display region B2 is improved, and thus the at least one second transparent display region B2 satisfies the requirement of the human face recognition device 21 or the 3D imaging device to collect light from the corresponding second transparent display region B2.

Optionally, with continued reference to FIG. 1 and FIG. 2, it may be set that the first transparent display region B1 and the at least one second transparent display region B2 are disposed adjacent to each other. The first transparent display region B1 and the at least one second transparent display region B2 are disposed adjacent to each other, so that the display boundary between the first transparent display region B1 and the at least one second transparent display region B2 can be weaken. Moreover, the display effect of the first transparent display region B1 and the display effect of the at least one second transparent display region B2 are different from the display effect of the main display region AA1 to a certain extent; the first transparent display region B1 and the at least one second transparent display region B2 being disposed adjacent to each other enables that transparent display regions are concentrated in one region of a display apparatus, such as a frame region, so that even though the display effect of the one region is slightly inferior to the display effect of the main display region AA1, the viewing effect will not be affected too much. In addition, since the light transmittance of the first transparent display region B1 and the light transmittance of the at least one second transparent display region B2 are both greater than the light transmittance of the main display region AA1, the number of wires of the first transparent display region B1 and the number of wires of the at least one second transparent display region B2 are both less than the number of wires of the main display region AA1, and the first transparent display region B1 and the at least one second transparent display region B2 being disposed adjacent to each other enables that the wires of the first transparent display region B1 and the wires of at least one second transparent display region B2 are more convenient to be connected, and the wiring is simpler.

Figure 3:
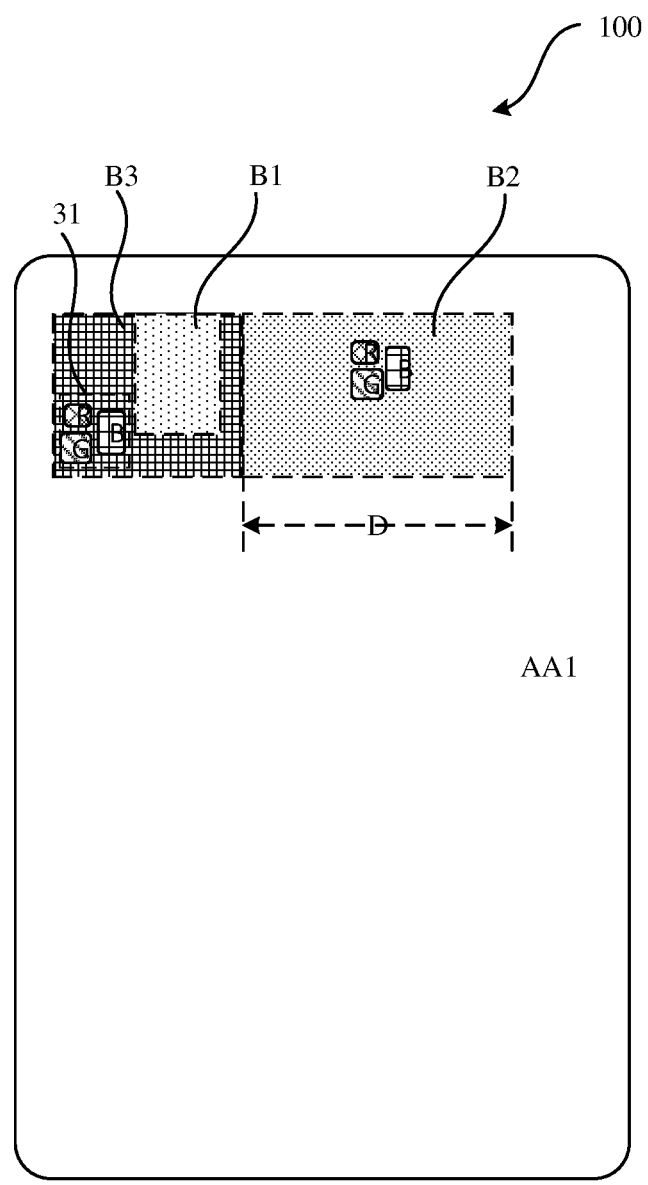
FIG. 3 is a top structural view of another display panel according to an embodiment.
Figure 4:
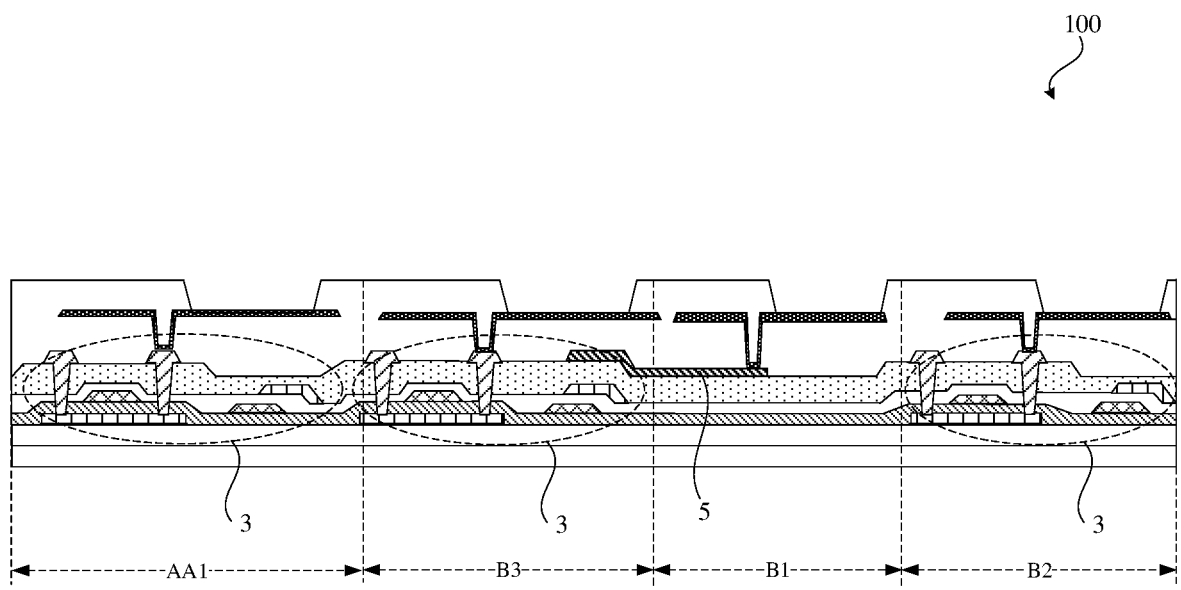
FIG. 4 is a sectional structural view of a display panel according to an embodiment.

FIG. 3 is a top structural view of another display panel according to an embodiment, and FIG. 4 is a sectional structural view of a display panel according to an embodiment. Referring to FIG. 3 and FIG. 4, the display panel 100 further includes a transition display region B3. The transition display region B3 is disposed around at least part of the first transparent display region B1, and the main display region AA1 is disposed around at least part of the transition display region B3. Pixel driving circuits 3 corresponding to light-emitting structures in the first transparent display region B1 and pixel driving circuits 3 corresponding to light-emitting structures in the transition display region B3 are all disposed in the transition display region B3. Pixel driving circuits 3 disposed corresponding to light-emitting structures in the at least one second transparent display region B2 are disposed in the at least one second transparent display region B2.

The pixel driving circuits 3 corresponding to the light-emitting structures in the first transparent display region B1 and the pixel driving circuits 3 corresponding to the light-emitting structures in the transition display region B3 are all disposed in the transition display region B3, so that the first transparent display region B1 has no pixel driving circuit, the light transmittance of the first transparent display region B1 can be maximized, and thus the first transparent display region B1 can satisfy the requirement of a front-facing camera for light transmittance. The transition display region B3 is disposed around at least part of the first transparent display region B1, so that pixel structures of the first transparent display region B1 are conveniently electrically connected to the pixel driving circuits 3 of the transition display region B3 through electrode wires 5, and thus the length of the electrode wires 5 is saved. FIG. 3 exemplarily shows a situation where the transition display region B3 is disposed around part of the first transparent display region B1.

The pixel driving circuits 3 disposed corresponding to the light-emitting structures in the at least one second transparent display region B2 are disposed in the at least one second transparent display region B2, so that the at least one second transparent display region B2 is not limited by the space of electrode wires. The at least one second transparent display region B2 can be set to a sufficiently large size according to the requirement of the device, and thus the at least one second transparent display region B2 has sufficient space to be provided with a device for human face recognition or a 3D imaging device. In this way, the full-screen display panel adopting the under-screen camera technology can achieve the human face recognition function or the 3D imaging function, the space utilization of the transparent display region of the display panel can be improved, and the problem of insufficient space of the transparent display region of the display panel can be improved.

Optionally, referring to FIG. 3 and FIG. 4, it may be set that the number of transistors and the number of capacitors included in the pixel driving circuits 3, the pixel resolution, and the pixel arrangement rule of the at least one second transparent display region B2 are all the same as the number of transistors and the number of capacitors included in the pixel driving circuits 3, pixel resolution, and a pixel arrangement rule of the transition display region B3, respectively. It may be set that each pixel 31 includes a red sub-pixel R, a green sub-pixel G and a blue sub-pixel B, and the pixel arrangement rule of the at least one second transparent display region B2 is the same as the pixel arrangement rule of the transition display region B3. It may be set that the relative position relationship between the pixels 31 in the at least one second transparent display region B2 is the same as a relative position relationship between pixels 31 in the transition display region B3, and the relative position relationship between a red sub-pixel R, a green sub-pixel G and a blue sub-pixel B in each pixel 31 in the at least one second transparent display region B1 is the same as a relative position relationship between a red sub-pixel R, a green sub-pixel G and a blue sub-pixel B in each pixel 31 in the transition display region B3.

The pixel resolution of the at least one second transparent display region is the same as the pixel resolution of the transition display region B3, so that the number of pixels of the at least one second transparent display region is the same as the number of pixels of the transition display region B3. The pixel arrangement rule of the at least one second transparent display region B2 is the same as the pixel arrangement rule of the transition display region B3, so that the display uniformity of the at least one second transparent display region B2 and the transition display region B3 is good, that is, the display effect of the at least one second transparent display region B2 is kept consistent with the display effect the transition display region B3. Therefore, the display boundary between the at least one second transparent display region B2 and the transition display region B3 is not obvious, and thus the display effect of the display panel is improved. In addition, the number of transistors and the number of capacitors included in the pixel driving circuit of the at least one second transparent display region B2 are the same as the number of transistors and the number of capacitors included in the pixel driving circuit of the transition display region B3, so that the drive of the at least one second transparent display region B2 is consistent with the drive of the transition display region B3. Therefore, the at least one second transparent display region B2 and the transition display region B3 can adopt a same gamma drive, so that it is not necessary to occupy an additional gamma drive module in the driver chip of the display panel.

Optionally, referring to FIG. 3 and FIG. 4, it may be set that the pixel resolution of the transition display region B3 and the pixel resolution of the first transparent display region B1 are each lower than the pixel resolution of the main display region AA1. The pixel resolution of the first transparent display region B1 is lower than the pixel resolution of the main display region AA1, so that the density of the pixel driving circuits required by the first transparent display region B1 is reduced. Thus, in the case where the pixel driving circuits 3 disposed corresponding to the light-emitting structures in the first transparent display region B1 and the pixel driving circuits 3 disposed corresponding to the light-emitting structures in the transition display region B3 are all disposed in the transition display region B3, the number of the pixel driving circuits 3 in the transition display region B3 can be reduced, and the space of the transition display region B3 can be saved. In addition, the pixel resolution of the transition display region B3 is lower than the pixel resolution of the main display region AA1, so that the density of the pixel driving circuits 3 corresponding to pixel structures of the transition display region B3 is reduced, and sufficient space is provided to accommodate the pixel driving circuits 3 corresponding to the pixel structures of the first transparent display region B1.

Optionally, referring to FIG. 3 and FIG. 4, it may be set that the at least one second transparent display region B2 and the transition display region B3 are disposed adjacent to each other. The second transparent display region B2 and the transition display region B3 are disposed adjacent to each other, so that the display boundary between the second transparent display region B2 and the transition display region B3 can be weaken. Moreover, since the display effect of the at least one second transparent display region B2 and the display effect of the transition display region B3 are different from the display effect of the main display region AA1 to a certain extent, the second transparent display region B2 and the transition display region B3 being disposed adjacent to each other enables that the at least one second transparent display region B2 and the transition display region B3 are concentrated in one region of a display apparatus, such as a frame region, so that even though the display effect of the one region is slightly inferior to the display effect of the main display region AA1, the viewing effect will not be affected too much. In addition, in the case where the light transmittance of the at least one second transparent display region B2 and the light transmittance of the transition display region B3 are equal and are both less than the light transmittance of the main display region AA1, the at least one second transparent display region B2 and the transition display region B3 being disposed adjacent to each other enables that the density of the pixel driving circuits corresponding to the pixel structures of the at least one second transparent display region B2 is the same as the density of the pixel driving circuits corresponding to the pixel structures of the transition display region B3, and the number of wires of the at least one second transparent display region B2 is the same as the number of wires of the transition display region B3, so that the wires of the at least one second transparent display region B2 and the wires of the transition display region B3 are more convenient to be correspondingly connected, and the wiring is simpler.

Optionally, with continued reference to FIGS. 1 to 4, along an arrangement direction of the first transparent display region B1 and the at least one second transparent display region B2, a width D of the at least one second transparent display region B2 is greater than or equal to 10 mm. The pixel driving circuits 3 corresponding to the pixel structures of the at least one second transparent display region B2 are disposed in the at least one second transparent display region B2, so that the at least one second transparent display region B2 does not have to be limited in size as the first transparent display region B1. The size of the at least one second transparent display region B2 may be designed to be relatively large. Along the arrangement direction of the first transparent display region B1 and the at least one second transparent display region B2, the width D of the at least one second transparent display region B2 may be set to be greater than or equal to 10 mm, so as to satisfy the use requirement of the human face recognition device 21 and the 3D imaging device 22, such as the use requirement of the structured light 3D imaging device or the time-of-flight 3D imaging device.

Figure 5:
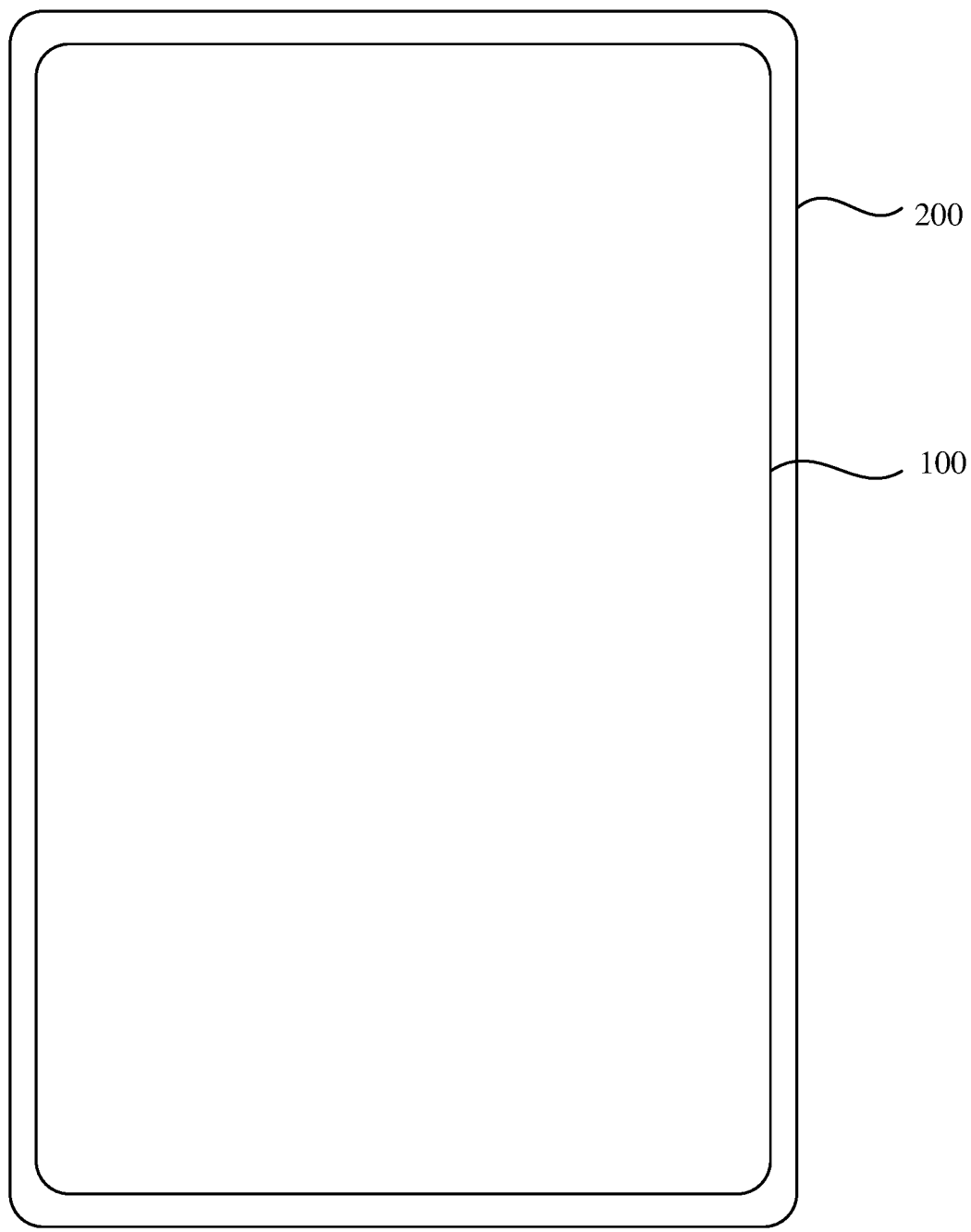
FIG. 5 is a structural view of a display apparatus according to an embodiment.

FIG. 5 is a structural view of a display apparatus according to an embodiment. Referring to FIG. 5, the display apparatus 200 provided by the embodiment of the present disclosure includes the display panel 100 of any one of the above embodiments, and has the beneficial effects of the display panel 100 of the above embodiments, which is not repeated herein. Exemplarily, the display apparatus may be a digital apparatus such as a mobile phone, a tablet, a palmtop computer, or an iPod.

What is claimed is:

1. A display panel, comprising:
    a first transparent display region, at least one second transparent display region, a main display region, and a transition display region, wherein:
    light transmittance of the first transparent display region is greater than light transmittance of the at least one second transparent display region, and the light transmittance of the at least one second transparent display region is greater than light transmittance of the main display region;
    a back of the display panel is provided with a first photosensitive element and a second photosensitive element;
    the first photosensitive element requires a greater brightness of light than the second photosensitive element, a position of the first photosensitive element corresponds to a position of the first transparent display region to enable light to pass through the first transparent display region and enter the first photosensitive element located on the back of the display panel, and a position of the at least one second transparent display region corresponds to a position of the second photosensitive element to enable light to pass through the at least one second transparent display region and enter the second photosensitive element located on the back of the display panel;
    the transition display region is disposed around at least part of the first transparent display region, and the main display region is disposed around at least part of the transition display region; and
    all pixel driving circuits corresponding to light-emitting structures in the first transparent display region are disposed in the transition display region with pixel driving circuits corresponding to light emitting structures in the transition display region.

2. The display panel according to claim 1, wherein:
    a pixel arrangement of the first transparent display region is the same as a pixel arrangement of the at least one second transparent display region,
    a number of transistors comprised in the pixel driving circuits of the first transparent display region is the same as a number of transistors comprised in the pixel driving circuits of the at least one second transparent display region, and
    a number of capacitors comprised in the pixel driving circuits of the first transparent display region is the same as a number of capacitors comprised in the pixel driving circuits of the at least one second transparent display region.

3. The display panel according to claim 2, wherein pixel resolution of the first transparent display region is lower than pixel resolution of the at least one second transparent display region, and the pixel resolution of the at least one second transparent display region is lower than pixel resolution of the main display region.

4. The display panel according to claim 3, wherein a number of pixels of the first transparent display region is less than a number of pixels of the at least one second transparent display region, and the number of pixels of the at least one second transparent display region is less than a number of pixels of the main display region.

5. The display panel according to claim 2, wherein a relative position relationship between pixels in the first transparent display region is the same as a relative position relationship between pixels in the at least one second transparent display region.

6. The display panel according to claim 2, wherein a relative position relationship between a red sub-pixel R, a green sub-pixel G and a blue sub-pixel B in each pixel in the first transparent display region is the same as a relative position relationship between a red sub-pixel R, a green sub-pixel G and a blue sub-pixel B in each pixel in the at least one second transparent display region.

7. The display panel according to claim 2, wherein the first transparent display region and the at least one second transparent display region are each configured to adopt a same gamma drive.

8. The display panel according to claim 1, wherein the first transparent display region and the at least one second transparent display region are disposed adjacent to each other.

9. The display panel according to claim 1, wherein pixel driving circuits corresponding to light-emitting structures in the at least one second transparent display region are disposed in the at least one second transparent display region.

10. The display panel according to claim 9, wherein a relative position relationship between pixels in the at least one second transparent display region is the same as a relative position relationship between pixels in the transition display region.

11. The display panel according to claim 1, wherein:
pixel resolution and a pixel arrangement of the at least one second transparent display region are the same as that of the transition display region,
a number of transistors comprised in each of the pixel driving circuits of the at least one second transparent display region is the same as a number of transistors comprised in each of the pixel driving circuits of the transition display region, and
a number of capacitors comprised in each of the pixel driving circuits of the at least one second transparent display region are the same as a number of capacitors comprised in each of the pixel driving circuits of the transition display region.

12. The display panel according to claim 11, wherein the pixel resolution of the transition display region and pixel resolution of the first transparent display region are lower than pixel resolution of the main display region.

13. The display panel according to claim 1, wherein the at least one second transparent display region and the transition display region are disposed adjacent to each other.

14. The display panel according to claim 1, wherein pixel structures of the first transparent display region are electrically connected to pixel driving circuits of the transition display region through electrode wires.

15. The display panel according to claim 1, wherein, along an arrangement direction of the first transparent display region and the at least one second transparent display region, a width of each of the at least one second transparent display region is greater than or equal to 10 mm.

16. The display panel according to claim 1, wherein:
the first photosensitive element comprises a camera component, and the second photosensitive element comprises at least one of a human face recognition device or a three-dimensional imaging device, and
the position of the at least one second transparent display region corresponds to a position of at least one of the human face recognition device or the three-dimensional imaging device.

17. The display panel according to claim 1, wherein the at least one second transparent display region comprises two second transparent display regions, and the two second transparent display regions are respectively disposed at two sides of the first transparent display region.

18. The display panel according to claim 1, wherein pixel resolution of the first transparent display region is lower than pixel resolution of the at least one second transparent display region, and the pixel resolution of the at least one second transparent display region is the same as pixel resolution of the transition display region.

19. The display panel according to claim 1, wherein the light transmittance of the at least one second transparent display region is equal to light transmittance of the transition display region.

20. The display panel according to claim 1, wherein a density of pixel driving circuits corresponding to pixel structures of the at least one second transparent display region is the same as a density of pixel driving circuits corresponding to pixel structures of the transition display region.

* * * * *